United States Patent Office 3,451,792
Patented June 24, 1969

3,451,792
BRAZED TITANIUM STRUCTURE
Thomas Kennedy Redden, Cincinnati, Ohio, assignor to General Electric Company, a corporation of New York
No Drawing. Filed Oct. 14, 1966, Ser. No. 586,665
Int. Cl. B23k 35/26; C22c 15/00
U.S. Cl. 29—194         1 Claim

ABSTRACT OF THE DISCLOSURE

Article members of titanium base alloys selected from those alloys nominally identified by weight as 6% Al-4% V-balance Ti; 5% Al, 2.5% Sn, balance Ti; and 6% Al, 2% Sn-4% Zr, 2% Mo, balance Ti can be brazed into an improved titanium structure below the beta transus temperature of such titanium base alloys through the use of a brazing alloy consisting essentially of, by weight, 47–48% Ti, 47–48% Zr and 4–6% Be.

---

This invention relates to brazed structures and, more particularly, to a structure of a metal selected from titanium and its alloys including a brazed joint.

The heat treatment for the wide variety of titanium alloys commercially available and of growing interest, particularly in the field of improved gas turbine engines, have been widely reported in the literature. Heat treatments such as are conducted for the purpose of adjusting properties or reducing stresses created during fabrication of titanium alloys are generally conducted below the beta transus temperature.

One method of joining members of titanium alloys to form a fabricated structure includes brazing the members together. One brazing alloy which had been widely used for this purpose was a silver base alloy containing about 5 weight percent aluminum. However, silver base brazing alloys have a tendency to getter chlorides, for example which might result from operation in a coastal area or aboard ship. Chlorides tend to embrittle joints resulting in joint failure.

It is a principal object of the present invention to provide a titanium or titanium alloy structure including a brazed joint formed at a temperature below that which will detrimentally affect the properties of the structural members being joined.

Another object is to provide such a brazed structure the braze joint of which is not susceptible to chloride gettering.

These and other objects and advantages will be more clearly understood from the following detailed discussion including examples which are typical of but not meant to be limitations on the scope of this invention.

Briefly, the above described objects can be satisfied by providing structural members including titanium alloys of the alpha or alpha-beta type fabricated to include a brazed joint of a brazing alloy consisting essentially of, by weight, 47–48% Ti; 47–48% Zr and 4–6% Be, the brazed joint having a Knoop hardness of about 550 or less after heat treatment for 2 hours at 1300° F.

One type of titanium base brazing alloy of interest is a Zr-Ti-Be brazing alloy reported in U.S. Patent 3,038,249—Gilliland et al. issued June 12, 1962. Disclosed in that patent is a ternary alloy consisting essentially of, by weight, 40–50% Zr; 40–50% Ti and 1–20% Be, the alloy being further classified by melting point and composition range according to the drawing of that patent. Although that patent lists approximate melting points for the various alloys described, it has been unexpectedly recognized that an alloy consisting essentially of, by weight, 47–48% Ti, 47–48% Zr and 4–6% Be has unusual brazing temperature characteristics particularly for titanium alloys compared with an alloy of slightly different compositions within the broad reported range. This will be more fully understood from the following table which lists the compositions of four alloy forms along with the temperature at which they brazed and wetted a titanium alloy member.

TABLE

| Ex. | Weight Percent | | | Complete melting (° F.) on 6 Al, 4 V-Ti | Knoop hardness, 1,300° F./2 hrs. | |
|---|---|---|---|---|---|---|
| | Ti | Zr | Be | | Braze | Diffusion zone |
| 1 | 47 | 47 | 6 | 1,550 | 493 | 467 |
| 2 | 48 | 48 | 4 | 1,550 | 550 | 520 |
| 3 | 49 | 48 | 3 | 1,950 | | |
| 4 | 50 | 48 | 2 | >1,950 | | |

It is to be noted that although the difference in composition between Examples 1 and 2 and between Examples 3 and 4 are relatively slight numerically, there is a great difference in the melting point. Whereas Examples 1 and 2 can be used to braze structures below the beta transus temperature of the commercially available alpha or alpha-beta type titanium alloys, Exmples 3 and 4 are above that beta transus temperature. A comparison between Examples 2 and 3 shows that with just a 1% change in beryllium, a 400° F. difference in melting point is realized. As a consequence for the significantly lower melting point for the alloy of Examples 1 and 2, the brazing temperature is at about 1675° F. In the case of Examples 3 and 4, the brazing temperature is about 2100° F. or more. It is most desirable to braze titanium alloys at a temperature below the beta transus to avoid detrimental property effects.

The alloys of the examples shown in Table I were made by melting commercially pure beryllium with titanium sponge from the Kroll process and with zirconium sponge. All of the alloys were arc melted in an inert gas chamber which had been evacuated to about 1 micron pressure and back-filled with argon.

In one series of tests to determine characteristics of a brazed joint, the powdered alloys were used to braze a 1" x 3" T-joint sample of a 6% aluminum-4% vanadium balance titanium alloy. This sheet alloy is typical of the alpha-beta type titanium base alloys including aluminum. Other typical examples are, by weight, 5% Al, 2.5% Sn balance Ti and 6% Al, 2% Sn, 4% Zr, 2% Mo, balance Ti. The samples were examined for degree of melting, wetting and flow properties. In addition, metallographic sections were made of the alloys and Knoop hardness data was taken in the as-brazed condition as well as after heating at 2 hours at 1350° F. It was found that the alloys of the Examples 1 and 2 resulted in good brazed joints which did not cause erosion of the metals being joined and had a Knoop hardness in the braze alloy of about 550 or less after 2 hours exposure at 1300° F. However, it was recognized that braze alloys or diffusion zone hardnesses above about 550 Knoop hardness will lead to unacceptable brittleness in the joint.

Although this invention has been described in connection with specific examples, it will be recognized by those skilled in the art the variations and modifications of which this invention is capable. It is intended by the appended claim to cover all such variations and modifications.

What is claimed is:

1. An article including a brazed joint between members of titanium alloys selected from the group of titanium base alloys consisting of, by weight, about 6% Al, about 4% V, balance Ti; about 5% Al, about 2.5% Sn, balance Ti; and about 6% Al, about 2% Sn, about 4% Zr, about 2% Mo, balance Ti;

the joint including a portion of the members, a brazing alloy and a diffusion zone between the brazing alloy and the members;

the brazing alloy in the brazed joint consisting essentially of, by weight, 47–48% Ti, 47–48% Zr and 4–6% Be; and the brazing alloy and the diffusion zone having a Knoop hardness of a maximum of about 550 after the joint is heated for 2 hours at 1300° F.

References Cited

UNITED STATES PATENTS

| | | | |
|---|---|---|---|
| 2,867,534 | 1/1959 | Jaffee | 75—175.5 |
| 2,914,848 | 12/1959 | Blum | 29—198 X |
| 2,948,608 | 8/1960 | Resnick | 75—175.5 |
| 3,038,249 | 6/1962 | Gilliland | 75—175.5 |
| 3,061,427 | 10/1962 | Luhan | 75—175.5 |
| 3,147,115 | 9/1964 | Vordahl | 75—175.5 |
| 3,151,003 | 9/1964 | Vordahl | 75—175.5 X |
| 3,370,946 | 2/1968 | Berteg | 75—175.5 |
| 3,378,368 | 4/1968 | Minton | 75—175.5 |

HYLAND BIZOT, *Primary Examiner.*

U.S. Cl. X.R.

29—198